US008755848B2

(12) United States Patent
Jain et al.

(10) Patent No.: US 8,755,848 B2
(45) Date of Patent: Jun. 17, 2014

(54) MOBILE DEVICE POWER MANAGEMENT

(75) Inventors: Nikhil Jain, San Diego, CA (US);
Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1404 days.

(21) Appl. No.: 11/241,283

(22) Filed: Sep. 30, 2005

(65) Prior Publication Data

US 2007/0077960 A1   Apr. 5, 2007

(51) Int. Cl.
*H04B 1/38* (2006.01)

(52) U.S. Cl.
USPC ..................... 455/574; 340/539.3

(58) Field of Classification Search
USPC ..................... 340/539.3; 455/574
See application file for complete search history.

(56) References Cited

U.S. PATENT DOCUMENTS

| 5,142,534 | A * | 8/1992 | Simpson et al. | 370/330 |
|---|---|---|---|---|
| 2002/0019584 | A1 * | 2/2002 | Schulze et al. | 600/300 |
| 2002/0030592 | A1 * | 3/2002 | Hakanen et al. | 340/442 |
| 2004/1054210 | | 6/2004 | Maki et al. | |
| 2005/0024501 | A1 * | 2/2005 | Ellenby et al. | 348/207.99 |
| 2005/0135302 | A1 * | 6/2005 | Wang et al. | 370/329 |
| 2005/0165514 | A1 * | 7/2005 | Kamdar et al. | 701/2 |

FOREIGN PATENT DOCUMENTS

| EP | 0650279 | | 4/1995 |
|---|---|---|---|
| JP | 2004180115 | A | 6/2004 |
| JP | 2004260386 | A | 9/2004 |
| JP | 2004349863 | A | 12/2004 |
| JP | 2005080197 | A | 3/2005 |
| WO | WO96/27993 | A | 9/1996 |
| WO | WO00/22837 | A | 4/2000 |

OTHER PUBLICATIONS

"Information Technology—Telecommunications and Information Exchange Between Systems—Local and Metropolitan Area Networks—Specific Requirements. Part II: Wireless LAN Medium Access Control and Physical Layer Specifications," International Standard ISO/IEC 8802-11, Aug. 20, 1999. pp. 123-137 XP002207975.
International Search Report—PCT/US06/038985, International Searching Authority—European Patent Office, Apr. 17, 2007.
Written Opinion—PCT/US06/038985, International Searching Authority—European Patent Office, Apr. 17, 2007.
Taiwanese Search Report—095133918—TIPO—Jan. 20, 2010.
Taiwanese Search report—095133918—TIPO—Sep. 24, 2010.

* cited by examiner

*Primary Examiner* — Patrick Edouard
*Assistant Examiner* — Matthew Genack

(57) ABSTRACT

The disclosure is directed to a mobile communication device, and method for controlling power saving features at the mobile device. A processor in the mobile device may be used to establish a network connection with a server in a first network. The mobile device may also include a transceiver that initiates transmission of a message to the server to determine if an incoming call request has been received via a second network. Advantageously, the transceiver is in a low power mode of operation for a selectable time interval when not communicating with the server.

50 Claims, 4 Drawing Sheets

MOBILE DEVICE POWER MANAGEMENT

BACKGROUND

1. Field

The present disclosure relates generally to telecommunications, and more particularly, to systems and methods to retrieving call set-up information for a mobile communications device in a power efficient manner.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

Interest in improving the mobile communications devices that take advantage of these various wireless wide area network technologies is almost as great as the interest in improving the underlying technologies themselves. More specifically, power management, or power conservation, techniques that extend or prolong the life of the batteries used in mobile communications devices has been one area of particular interest. One common technique used in cellular CDMA networks involves the use of a paging channel and, sometimes, a quick paging channel. A paging channel is often used to notify a mobile device, such as a cellular telephone or another type of wireless terminal, that an incoming request to communicate is pending for the mobile device. The use of such a paging channel allows the mobile device to be in a low-power mode, often referred to as "sleep mode", at all times except for its assigned time slot for listening to the paging channel. If no call is pending, then the mobile device need only remain active long enough to listen to its assigned slot on the paging channel before returning to the sleep mode. Another technique is to use a quick paging channel in which the mobile device listens to the quick paging channel for even a briefer period of time to determine if it should stay active long enough to listen to its slot on the paging channel.

As the demand for wireless information services continue to increase, mobile devices are evolving to support integrated voice, data, and streaming media while providing seamless network coverage between wide area cellular networks and wireless local area networks (LAN). Wireless LANs generally provide telephony and data services over relatively small geographic regions using a standard protocol, such as IEEE 802.11, Bluetooth, or the like. The existence of wireless LANs provides a unique opportunity to increase user capacity in a wide area cellular network by extending cellular communications to the unlicensed spectrum using the infrastructure of the wireless LAN.

However, unlike in CDMA and other cellular networks, access to the transmission medium in a wireless LAN occurs in an asynchronous or random manner. Accordingly, the traditional CDMA paging channel or quick paging channel, previously described which relies on the mobile devices being synchronized to a common clock, cannot be implemented in the wireless LAN environment. In some wireless LAN environments, no power saving modes are contemplated and, therefore, the mobile communications devices using such a wireless LAN are always in an active mode. In other instances, certain wireless LAN technologies have implemented some type of power saving techniques by a periodic broadcast of information packets identifying which mobile devices have waiting data (e.g., TIM packets within the 802.11b/g networks). However, without any synchronizing information to know when the information packet will be broadcast, a mobile device must remain in an active mode for at least the time interval between the information packet broadcasts to ensure the mobile device is made aware of the waiting data in a timely manner. While this latter technique does provide some power savings, it remains inefficient at conserving power and prolonging battery life in mobile communications devices.

Thus, regardless of whether a mobile communications device is primarily communicating via a wireless LAN or a wide area cellular network, efficient power management so as to prolong battery life remains an important consideration in system and device design.

SUMMARY

One aspect of a mobile communications device as described herein relates to a device having a processor that is configured to establish a network connection with a server using a first network. Furthermore, the device includes a transceiver in communication with the processor that is configured to transmit a message to the server to determine if an incoming call request for the mobile communications device has been received at the server from a second network.

Another aspect of a mobile communications device as described herein relates to a device having a processor that is configured to operate the device in at least one of an active mode and a sleep mode wherein the processor is further configured to communicate with a server over a first network. The device further includes a memory configured to store a selectable sleep mode interval configurable by a user and a transceiver. The transceiver is configured to transmit a message to the server to determine if an incoming call request for the mobile communications device has been received at the server from a second network. More particularly, the message is transmitted upon the mobile communications device transitioning from the sleep mode to the active mode.

One aspect of a communications system described herein relates to a server which is configured to store data for a mobile communications device. The mobile communications device includes a processor that operates the mobile communications device in a sleep mode for a predetermined duration and in an active mode. A transceiver controlled by the processor is configured to transmit a message to the server upon expiration of the predetermined duration to indicate that the mobile communications device is in the active mode. In response to the message, the server is further configured to transmit the data to the mobile communications device.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, various techniques will be described in connection with conserving power when a mobile device is connected with a wireless LAN. A number of these techniques will be described in the context of a mobile communications device traveling through a wide area cellular network with one or more wireless LANs dispersed throughout the cellular coverage region. The mobile communications device may be any suitable device capable of wireless telephony or data communications, such as a cellular phone designed for operation in a CDMA2000 1x network. The mobile communications device may also be suitable for operation within other network technologies such as UMTS or other non-CDMA technologies such as GSM and GPRS. In addition to such wide area networks, the mobile communications device may be capable of employing any suitable protocol for accessing a wireless LAN, including, by way of example, IEEE 802.11, Bluetooth, IrDA, etc. Accordingly, while one specific environment, such as that of FIG. 1, may be described with reference to a mobile communications device operating within a CDMA cellular network and an 802.11 Wireless LAN, such a description is intended only to illustrate various aspects of the present invention, with the understanding that these aspects have a wide range of applications to various other types of networks and technologies.

Figure 1:
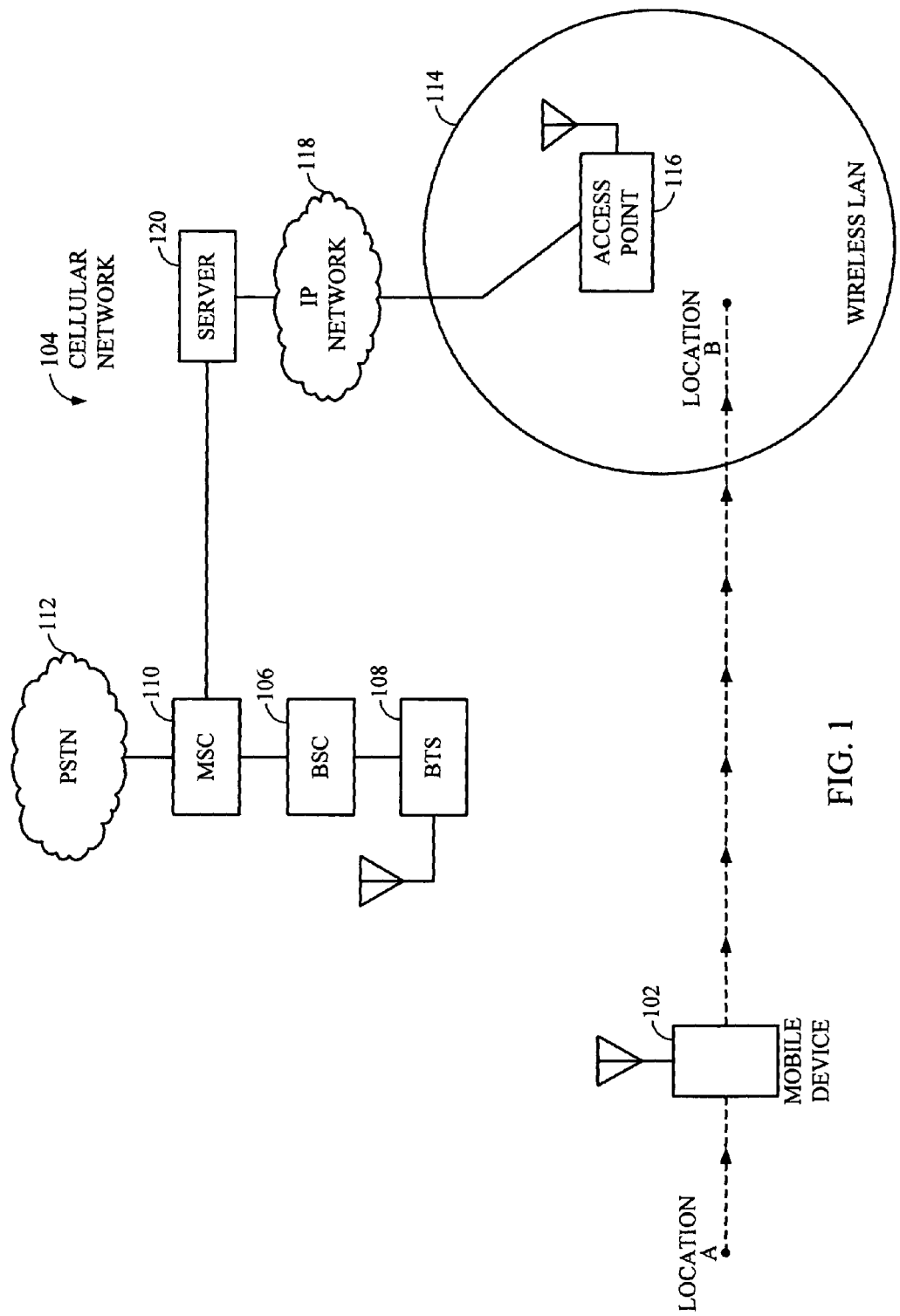
FIG. 1 is a conceptual block diagram of an embodiment of a wireless communications system.

FIG. 1 is a conceptual block diagram of an embodiment of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1 for simplicity of explanation. A mobile switching center (MSC) 110 may be used to provide a gateway to a public switched telephone network (PSTN) 112. Although not shown in FIG. 1, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

The cellular network 104 may also include one or more wireless LANs dispersed throughout the cellular coverage region. A single wireless LAN 114 is shown in FIG. 1. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state and periodically awaken and listen to the paging channel (or quick paging channel) until a call is initiated, either by the mobile device 102 or the PSTN 112. Either way, an air traffic link may be established between the mobile device 102 and the BTS 108 to set up and support the call.

As the mobile device 102 moves through the cellular network 104 from location A to location B in the depicted embodiment, it begins to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a network connection with the server 120. When connected to the IP network 114, the mobile device 102 may still receive an incoming call request from a user via the MSC 110. However, in this instance the call is established through the server 120 instead of the BTS 108.

Figure 2:
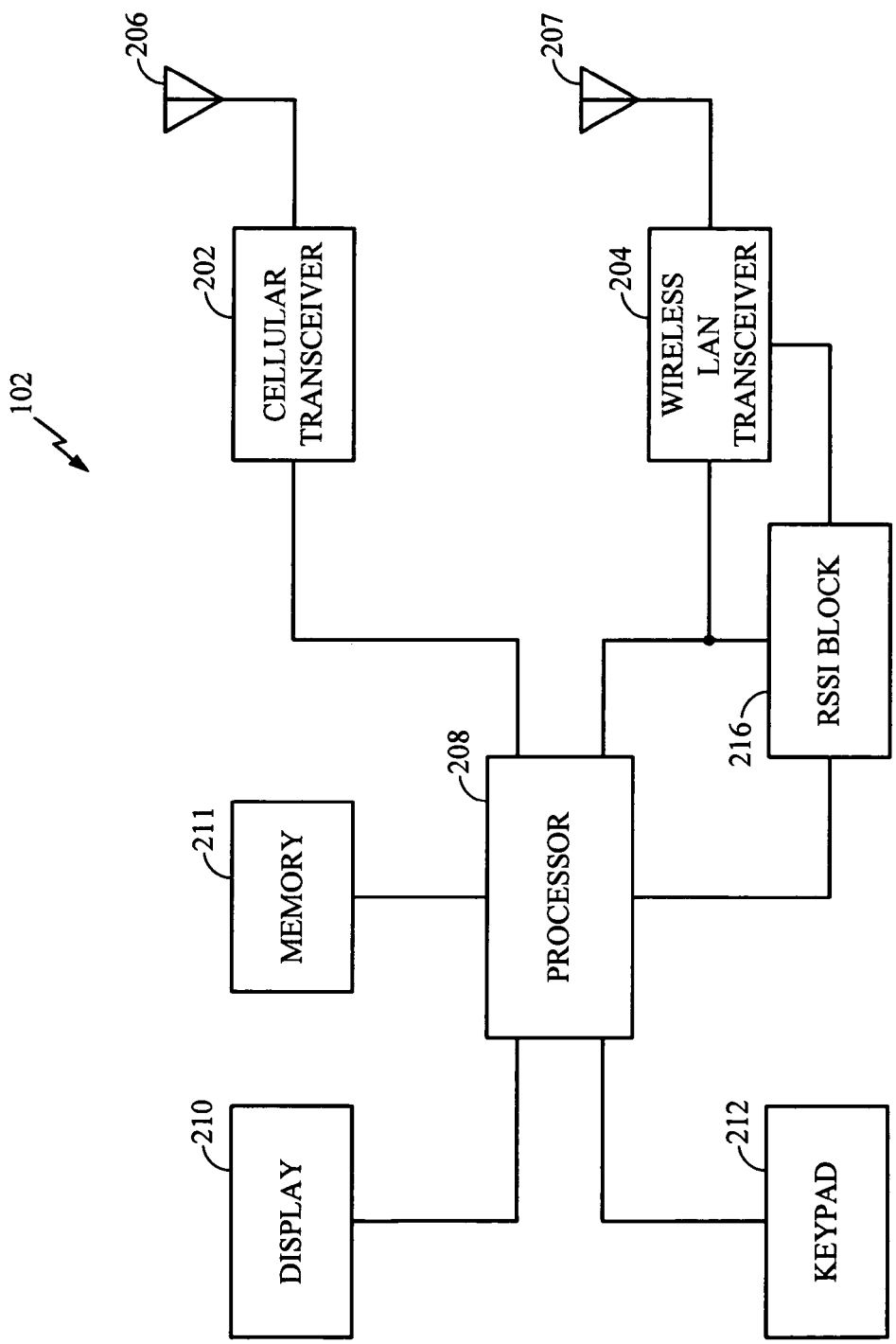
FIG. 2 is a functional block diagram illustrating an example of a mobile device capable of supporting both cellular and wireless LAN communications.

FIG. 2 is a functional block diagram illustrating an example of a mobile device capable of supporting both cellular and wireless LAN communications. The mobile device 102 may include a cellular transceiver 202 and a wireless LAN transceiver 204. In at least one embodiment of the mobile device 102, the cellular transceiver 202 is capable of supporting CDMA2000 1x communications with a BTS (not shown), and the wireless LAN transceiver 204 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 202, 204 is shown with a separate antenna 206, 207, respectively, but the transceivers 202, 204 could share a single broadband antenna. Each antenna 206, 207 may be implemented with one or more radiating elements.

The mobile device 102 is also shown with a processor 208 coupled to both transceivers 202, 204, however, a separate processor may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 208 to the keypad 212, display, 210, and other user interfaces (not shown). The processor 208 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application. Mobile device 102 may also include memory 211 and an RSSI block 216.

The processor 208 may be configured to execute an algorithm to place the mobile device 102 in a low power mode, or sleep mode, so as to conserve power and to periodically activate the mobile device when appropriate. The algorithm may be implemented as one or more software applications supported by the microprocessor based architecture discussed earlier. Alternatively, the algorithm may be a module separate from the processor 208. The module may be implemented in hardware, software, firmware, or any combination thereof. Depending on the specific design constraints, the algorithm could be integrated into any entity in the mobile device 102, or distributed across multiple entities in the mobile device 102.

When the mobile device 102 has been handed off to the wireless LAN 114, the power saving techniques of the cellular network 104 are no longer available (e.g. using the paging or quick paging channels). Accordingly, other techniques and methods may be used by the mobile device 102 to manage power usage within the wireless LAN 114. A particular example is described below with reference to an 802.11a/b/g wireless LAN. However, this type of wireless LAN is provided merely by way of example and one of ordinary skill will recognize that other types of wireless LANs are contemplated within the scope of the present invention.

The 802.11 standard does support some power management functionality. In particular, part of the association process between a mobile device 102 and an access point 116, may include establishment of a "Listen Interval" which refers to the number of beacon periods a mobile station will sleep. While the mobile device 102 sleeps, the access point 116 buffers data for the device 102 and periodically builds and transmits a control frame indicating what mobile devices within the wireless LAN 114 have buffered data waiting. At the end of the Listen Interval, the mobile device 102 will wake up and enter the active mode to listen for this control frame. If buffered data is waiting, the mobile device 102 and access point 116 then exchange the data as typically done.

The above power management functionality, if even implemented and supported by the access point 116, allows a mobile device to stay in the low-power, or sleep, mode on the order of hundreds of milliseconds after which the receiver is turned on to the active state. Furthermore, other types of wireless LANs may have no built-in power management functionality which results in the mobile device 102 always remaining in the active state. Accordingly, improved power management functionality is needed that, for example, permits mobiles devices to remain in sleep mode on the order of seconds, allows a user of a mobile device to control the power management parameters, and allows for sleep mode operation within wireless LANs that offer no native support.

Figure 3:
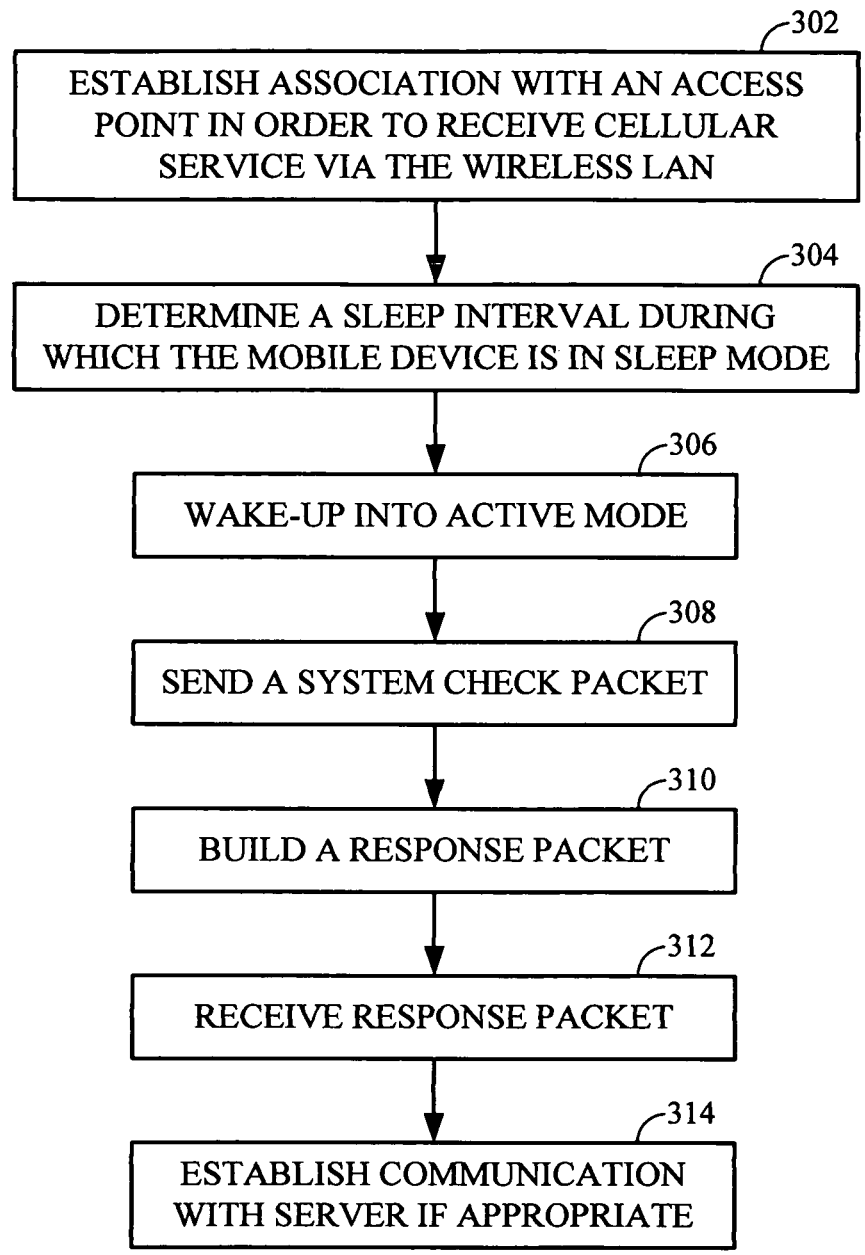
FIG. 3 is a flow diagram illustrating the functionality of a power saving algorithm in the mobile device while connected to a wireless LAN as depicted in FIG. 1.

The algorithm depicted in FIG. 3 describes one exemplary method for providing improved power management for a mobile device 102 within a wireless LAN 114. In step 302, the mobile device establishes a connection with a wireless LAN. In an 802.11 LAN, for example, the mobile device associates with an access point whereas in a Bluetooth network the mobile device would join a personal are network (PAN). Once the connection to the wireless LAN is established, then the mobile device will receive its cellular service from (see FIG. 1) the MSC 110 to the server 120 to the wireless LAN 114.

In accordance with the exemplary method of FIG. 3, the user of the mobile device 102 may determine the power management settings for the mobile device, in step 304. More specifically, the user may determine how long a mobile device 102 will remain in sleep mode. Depending on the circumstances of the user of the mobile device 102, the desired sleep mode interval may vary. The longer the mobile device 102 is in sleep mode, the greater the power savings (and the longer the battery life). However, when the mobile device 102 is in sleep mode it is unable to determine a incoming call request has been received. It is when the mobile device 102 wakes up and discovers a call request is waiting, that it can signal the user, such as by ringing. Thus, the user of the mobile device 102 determines based on their circumstances how long of a sleep mode interval to set knowing that greater power savings comes at the expense of slower response times to incoming call requests.

In practice, the sleep mode interval may be selected by the user, in step 304, just as any other control setting offered by, and stored in, the mobile device 102. Furthermore, the sleep mode interval setting may occur automatically using a default value whenever the mobile device 102 establishes service with the wireless LAN 114 or the user may be prompted each time for this setting whenever service is established with a wireless LAN 114. The sleep mode interval settings that a user may specify or select include, but are not limited to, time periods on the orders of seconds.

Although the user may select a sleep mode interval that lasts on the order of seconds, some wireless LANs may have certain requirements related to periodic transmissions such as "keep-alive" messages. For example, in accordance with some wireless LAN specifications, the physical media layer may require each device to periodically send a brief identification message. The exemplary algorithm depicted in FIG. 3 may operate within these constraints such that the device 102 exits sleep mode to the extent necessary to satisfy any underlying network or media access protocol requirements and then returns to the sleep mode.

As the mobile device 102 operates within the wireless LAN 114, the mobile device 102 will eventually enter in sleep mode. In general the sleep mode may be a mode in which power consumption is lower than when the device 102 is in active mode. In one particular embodiment, sleep mode entails turning off both the wireless LAN transmitter and receiver. However, the processor of the mobile device 102 may remain fully operational in sleep mode or, itself, enter a power saving mode. The mobile device 102 remains in sleep mode for the duration of the selected sleep mode interval and then, in step 306, wakes up from sleep mode into active mode. Upon waking-up, the mobile device, in step 308, transmits a system check packet via the wireless LAN 114 to the server 120.

As typical within any IP, or similar network, packet enough identifying information is in the system check packet for the server 120 to determine the sender and contents of the packet. This system check packet sent from the mobile device 102 is advantageously small so that it can be transmitted quickly and traverse the IP network 118 quickly. However, one of ordinary skill will recognize that the system check packet may actually entail more than one distinct packet and that this phrase "system check packet" generally refers to a message or some other communications request between the mobile device 102 and the server 120.

When the server 120 receives the system check packet, the server 120, in step 310, determines if an incoming call request is waiting for the device 102. If no request is waiting, then a brief reply, or response, message is returned to the mobile device 102. If, however, an incoming call request is waiting, then a different response message is built in step 310. In particular, the response message that is built includes the information used by the mobile device 102 to establish a connection through the server 120 to handle the incoming call. Thus, this type of response message can be thought of as a paging packet because it is similar to the paging message in the cellular network that provides the notification of an incoming call and the information used to set-up and handle the call.

In step 312, the mobile device 102 receives the response message (which may be one or more packets) from the server and handles it as is typical with any packet received via the wireless LAN 114. If no call request is waiting, then the mobile device may return to sleep mode. However, the mobile device is assured by simply be receiving the response message that the connection to and from the server 120 is intact and operational. If no response message is received, then the mobile device may enter a troubleshooting mode to determine if the connection through the wireless LAN is not functioning properly and whether or not to re-establish a link with the cellular network 104

If the response message indicates that a call request is waiting, then the mobile device 102 may remain in active mode and establish, in step 314, communication with the server to receive the incoming call request. This incoming call request may relate to a variety of different communication modalities such as a data transfer or data exchange, a voice call, a short message service (SMS) message, a multimedia message service (MMS) message, etc. Regardless of the type of the incoming call, the mobile device communicates with the server 120 to handle the call in a typical manner and can then, once again, return to sleep mode for the selected sleep mode interval.

One of ordinary skill will recognize that there are a variety of functionally equivalent ways to accomplish sending a response message to the mobile device to alert them of an incoming call request. For example, the response message may simply have one or more bits set that inform the mobile device to stay awake and wait for the call-set-up, or paging, information in a subsequent packet. As an alternative, the response message from the server 102, may include within it all the needed call set-up information.

Thus, in accordance with the algorithm of FIG. 3 just described, the mobile device is the initiator of the request for the paging information after exiting sleep mode and, furthermore, the user of the mobile device determines the power saving level of the mobile 102 by selecting the sleep mode interval. One result is that the algorithm of FIG. 3 does not rely or depend on any power saving functionality being implemented or even contemplated by the wireless LAN 114.

Figure 4:
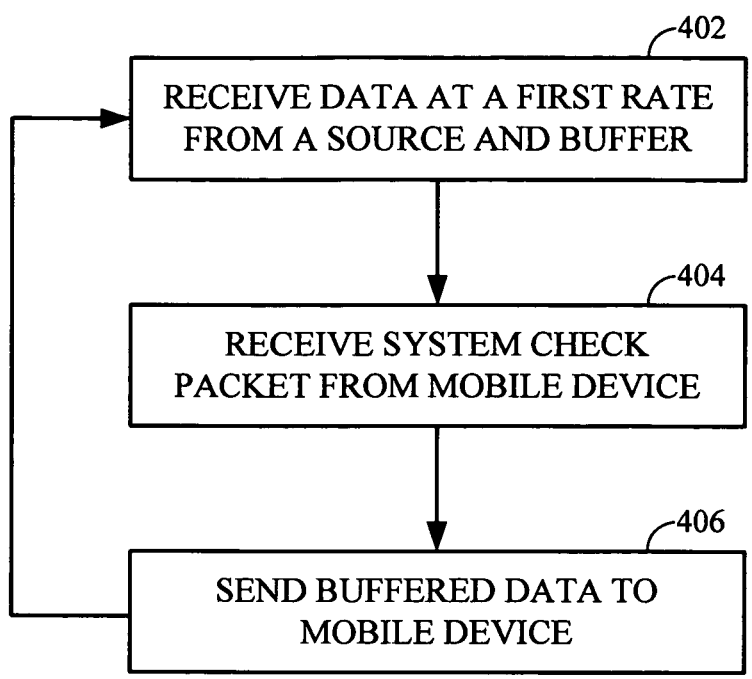
FIG. 4 is a flow diagram illustrating the functionality of a power saving algorithm during data transfers occurring within the system of FIG. 1.

In addition to receiving call set up, or paging, information from the server 120, the mobile device also typically receives other data as well. For example, the mobile device 102 may receive streaming audio or video data from a subscription service or other type of provider. In accordance with the example algorithm of FIG. 4, the system check packet previously described may be used to control data transfers so as to save power.

In step 402, the server 120 receives data from a data source (not shown) at a particular transmission rate that is destined for the mobile device 102. This data may indirectly arrive from the MSC 100 or may be delivered through some other connection between the data source and the server 120. The server 120 and the mobile device 102 then exchange this information via the IP network 118 and the wireless LAN 114. Typically, exchange of such a data stream will result in the mobile device 102 remaining in the active mode until all the data is sent from the server 120.

The transmission rate that the data is being transmitted from the data source may be significantly less than the data transmission rate of the IP network 118 and the wireless LAN 114. In this instance, then, it is inefficient to keep the mobile device 102 in the active mode for the entire data exchange. For example, if the entire data exchange involves 1 megabit generated from the data source at 1000 bits per second, then the data transfer would require 1000 seconds. If, however, the bandwidth of the wireless LAN is around 1 Megabit per second, then the data (the entire 1 Megabit) could be buffered at the server and sent to the mobile device in about 1 second. The result is a significant difference in the time the mobile device is in active-mode receiving data.

A different alternative is that data may be generated at the data source faster than the mobile device 102 can receive and process the data. In this instance, the server 120 may still buffer data for the mobile device 102 and then deliver it at a rate the mobile device 102 can handle.

Thus, returning to step 402, the data received at the server 120 is buffered by the server 120. When the mobile device awakens from sleep mode it will send the system check packet to the server indicating that it is in the active mode and ready to receive any buffered data.

Upon receiving, in step 404, the system check packet from the mobile device 102, the server 120 will send buffered data to the mobile device, in step 406. Once the buffered data is received, the mobile device may automatically return to sleep mode for the selected sleep interval. Or, alternatively, it may selectively whether to enter the sleep mode or stay in the active mode depending on whether the server 120 has another full buffer to send. This process may repeat until a particular data exchange is completed. Therefore, in accordance with this algorithm, the mobile device 102 initiates and controls the transfer of data at selected times through the use of the system check packet thereby allowing the mobile device to remain in sleep mode while not receiving data.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A mobile communications device, comprising:
a processor configured to establish a network connection with a server via a first network using a first network technology; and
a transceiver, in communication with the processor, configured to transmit a system check message to the server to determine if an incoming call request for the mobile communications device has been received at the server;
wherein the processor is further configured to receive a predetermined time interval input from a user, to set the predetermined time interval according to the received user input, to maintain the mobile communications device in a sleep mode for the predetermined time interval and, upon expiration of the predetermined time interval, to change the mobile communications device from the sleep mode of operation to an active mode of operation to transmit the system check message without transmitting other intervening communication to the server;
wherein the processor is configured to determine whether the incoming call request has been received at the server based on a response to the system check message; and
wherein, if the processor determines that the response is not received, the mobile communications device is configured to establish a connection with a second network using a second network technology based at least in part upon an initial registration with the second network prior to entering the sleep mode, the second network technology being different from the first network technology.

2. The mobile communications device of claim 1, wherein the transceiver is further configured to receive a response message indicating the response from the server via the first network connection.

3. The mobile communications device of claim 2, wherein the processor is further configured to establish a communications channel through the first network connection with an originator of the incoming call request based on the response message.

4. The mobile communications device of claim 2, wherein the response message includes call set-up information related to the incoming call request.

5. The mobile communications device of claim 1, wherein the incoming call request is one of a data exchange, a voice call, and a text message.

6. The mobile communications device of claim 1, wherein the processor is further configured to establish the network connection with the server via the first network, and wherein the incoming call request has been received at the server from the second network.

7. The mobile communications device of claim 1, wherein the transceiver is further configured to be turned off while the mobile communications device is in the sleep mode and to be turned on while the mobile communications device is in the active mode.

8. The mobile communications device of claim 1, wherein the first network comprises a wireless LAM and the second network comprises a cellular network.

9. A mobile communications device, comprising:
a processor configured to: operate the mobile communications device in at least an active mode and a sleep mode, and communicate with a server via a first network using a first network technology;
a memory accessible to the processor configured to store a selectable sleep mode interval setting; and a transceiver, controlled by the processor, configured to transmit a system check message to the server to determine if an incoming call request for the mobile communications device has been received at the server from a second network;

wherein the processor is further configured to receive a selectable sleep mode interval input from a user, to set the selectable sleep mode interval according to the received user input, to maintain the mobile communications device in the sleep mode for the selectable sleep mode interval and, upon expiration of the selectable sleep mode interval, to change the mobile communications device from the sleep mode of operation to an active mode of operation to transmit the system check message without transmitting other intervening communication to the server;

wherein the processor is configured to determine whether an incoming call request has been received at the server based on a reply to the system check message; and wherein, if the processor determines that the reply is not received, the mobile communications device is configured to establish a connection with the second network using a second network technology based at least in part upon an initial registration with the second network prior to entering the sleep mode, the second network technology being different from the first network technology.

10. The mobile communications device of claim 9, wherein the transceiver is further configured to receive the reply in response to the system check message, the reply at least indicating if an incoming call request for the mobile communications device has been received at the server and indicating call setup information for the incoming call request.

11. The mobile communications device of claim 10, wherein the processor is further configured to establish a connection with an originator of the incoming call request based on the reply.

12. The mobile communications device of claim 11, wherein the incoming call request is one of a data exchange, a voice call, and a text message.

13. The mobile communications device of claim 9, wherein the first network comprises a wireless LAN and the second network comprises a cellular network.

14. A communications system, comprising:
a server configured to store data for a mobile communications device via a first network using a first network technology while the mobile communications device is in a sleep mode; and
a receiver configured to receive a system check message from the mobile communications device upon the mobile communications device changing from a sleep mode to an active mode, without intervening communication, the system check message being configured to indicate the mobile communications device is in the active mode and to request a response indicating whether an incoming call request for the mobile communications device has been received at the server;
wherein the server, in response to receiving the system check message, is further configured to determine whether an incoming call request has been received for the mobile communications device and to transmit the response indicating whether an incoming call request has been received for the mobile communications device, and
if the server fails to provide the response, the mobile communications device is configured to establish a connection with a second network using a second network technology based at least in part upon an initial registration with the second network prior to entering the sleep mode, the second network technology being different from the first network technology.

15. The system of claim 14, wherein the mobile communications device and the server communicate via the first network, and the data is received at the server via the second network.

16. The system of claim 15, wherein the first network comprises a wireless LAN and the second network comprises a cellular network.

17. The system of claim 16, wherein the data is received at the server at a first data rate and wherein the server is configured to transmit the data to the mobile communication device at a second data rate different from the first data rate.

18. A mobile communications device, comprising:
means for establishing a network connection with a server via a first network using a first network technology;
means for transmitting a system check message to the server to determine if an incoming call request for the mobile communications device has been received at the server from a second network;
means for receiving a predetermined time interval input from a user, means for setting the predetermined time interval according to the received user input, means for maintaining the mobile communications device in a sleep mode for a predetermined time interval and, upon expiration of the predetermined time interval, means for changing the mobile communications device from the sleep mode of operation to an active mode of operation to transmit the system check message without transmitting other intervening communication to the server;
means for determining whether an incoming call request has been received at the server based on a response to the system check message; and
if it is determined that the response is not received, means for establishing a connection with the second network using a second network technology based at least in part upon an initial registration with the second network prior to entering the sleep mode, the second network technology being different from the first network technology.

19. A mobile communications device, comprising:
means for establishing a network connection with a server via a first network using a first network technology, the server storing buffered data for transmission to the mobile communications device, said buffered data received at the server via a second network using a second network technology, the second network technology being different from the first network technology;
means for transmitting system check a message to the server to indicate the mobile communications device is in an operating mode able to receive data from the server and to determine if an incoming call request for the mobile communications device has been received at the server;
means for receiving a selectable sleep mode interval input from a user, for setting the selectable sleep mode interval according to the received user input, for maintaining the mobile communications device in a sleep mode for the selectable sleep mode interval and, upon expiration of the selectable sleep mode interval, for changing the mobile communications device from the sleep mode of operation to an active mode of operation to transmit the system check message without transmitting other intervening communication to the server;

means for determining whether an incoming call request has been received at the server based on a response to the system check message; and if it is determined that the response is not received, means for establishing a connection with the second network using the second network technology based at least in part upon an initial registration with the second network prior to entering the sleep mode.

20. A method for conserving power of a mobile communications device, comprising:

establishing a network connection between the mobile communications device and a server via a first network using a first network technology;

receiving a selectable time interval input from a user;

setting the selectable time interval according to the received user input;

maintaining the mobile communications device in a sleep mode of operation during the selectable time interval;

upon expiration of the selectable time interval, changing the mobile communications device to an active mode of operation and transmitting a system check message to the server without transmitting other intervening communication to the server to determine if an incoming call request for the mobile communications device has been received at the server;

determining whether an incoming call request has been received at the server based on a response to the system check message; and if the server fails to provide the response, the mobile communications device is configured to establish a connection with a second network using a second network technology based at least in part upon an initial registration with the second network prior to entering the sleep mode, the second network technology being different from the first network technology.

21. The method according to claim 20, further comprising:

in the response to the system check message, receiving from the server call set-up information related to the incoming call request.

22. The method according to claim 20, wherein the system check message is transmitted via the first network, and the incoming call request is received via the second network.

23. The method according to claim 20, wherein the first network comprises a wireless LAN, and the second network comprises a cellular network.

24. The method according to claim 20, further comprising:

establishing a voice call, through the server, with an originator of the incoming call request.

25. A module residing in a non-transitory storage medium, comprising:

information for establishing a network connection with a server via a first network using a first network technology;

information for transmitting a system check message to the server to determine if an incoming call request for a mobile communications device has been received at the server from a second network;

information for receiving a predetermined time interval input from a user, for setting the predetermined time interval according to the received user input, for maintaining the mobile communications device in a sleep mode for the predetermined time interval and, upon expiration of the predetermined time interval, for changing the mobile communications device from the sleep mode of operation to an active mode of operation to transmit the system check message without transmitting other intervening communication to the server;

information for determining whether an incoming call request has been received at the server based on a response to the system check message; and if the server fails to provide the response, information for establishing a connection with the second network using a second network technology based at least in part upon an initial registration with the second network prior to entering the sleep mode, the second network technology being different from the first network technology.

26. A module stored in a non-transitory storage medium, comprising:

information for establishing a network connection with a server via a first network using a first network technology, the server storing buffered data for transmission to a mobile communications device, said buffered data received at the server via a second network; and information for transmitting a system check message to the server to indicate the mobile communications device is in an operating mode able to receive data from the server and to determine if an incoming call request for the mobile communications device has been received at the server;

information for receiving a selectable sleep mode interval input from a user, for setting the selectable sleep mode interval according to the received user input, for maintaining the mobile communications device in a sleep mode for the selectable sleep mode interval and, upon expiration of the selectable sleep mode interval, and for changing the mobile communications device from the sleep mode of operation to an active mode of operation to transmit the system check message without transmitting other intervening communication to the server;

information for determining whether an incoming call request has been received at the server based on a response to the system check message; and if the server fails to provide the response, information for establishing a connection with the second network using a second network technology based at least in part upon an initial registration with the second network prior to entering the sleep mode, the second network technology being different from the first network technology.

27. A method for indicating the receipt of an incoming call request for a mobile communications device, comprising:

storing data for the mobile communications device at a server while the mobile communications device is in a sleep mode;

receiving, via a first network using a first network technology, a system check message from a mobile communications device upon the mobile communications device changing from a sleep mode to an active mode, without intervening communication, the system check message indicating that the mobile communications device is in the active mode and requesting a response indicating whether an incoming call request for the mobile communications device has been received at the server;

in response to receiving the system check message, determining whether an incoming call request has been received at the server for the mobile communications device; and transmitting the response indicating whether the incoming call request has been received for the mobile communications device, wherein, if the server fails to provide the response, the mobile communications device is configured to establish a connection with a second network using a second network technology based at least in part upon an initial registration with the second network prior to entering the sleep mode, the second network technology being different from the first network technology.

28. The method of claim 27, further comprising:
receiving the data at the server via the second network.

29. The method of claim 27, wherein the first network comprises a wireless LAN, and the second network comprises a cellular network.

30. The method of claim 28, further comprising:
receiving the data at the server at a first data rate; and
transmitting the data to the mobile communications device at a second data rate different from the first data rate.

31. A module stored in a non-transitory storage medium, comprising:
information for storing data for the mobile communications device at a server while the mobile communications device is in a sleep mode;
information for receiving, via a first network using a first network technology, a system check message from a mobile communications device upon the mobile communications device changing from a sleep mode to an active mode, without intervening communication, the system check message indicating that the mobile communications device is in the active mode and requesting a response indicating whether an incoming call request for the mobile communications device has been received at the server; and
information for determining whether the incoming call request has been received at the server for the mobile communications device and transmitting the response in response to receiving the system check message,
wherein, if the server fails to provide the response, the mobile communications device is configured to establish a connection with a second network using a second network technology based at least in part upon an initial registration with the second network prior to entering the sleep mode, the second network technology being different from the first network technology.

32. The module according to claim 31, further comprising:
information for receiving the data at the server via the second network.

33. The module according to claim 26, further comprising:
information for receiving the data at the server at a first data rate; and
information for transmitting the data from the server to the mobile communication device at a second data rate different from the first data rate.

34. The mobile communications device according to claim 1, wherein if no response is received, the processor is configured to enter a troubleshooting mode to determine whether the established network connection is functioning properly.

35. The method of claim 20, further comprising:
if no response is received from the server, entering a troubleshooting mode to determine whether the established connection is functioning properly.

36. The mobile communications device according to claim 1, wherein the transceiver is configured to transmit the system check message to the server upon expiration of the sleep mode based upon the initial registration.

37. The mobile communications device according to claim 9, wherein the transceiver is configured to transmit the system check message to the server upon expiration of the sleep mode based upon the initial registration.

38. The communications system according to claim 14, wherein the receiver is configured to receive the system check message based on the initial registration by the mobile communications device and in response to an expiration of the sleep mode on the mobile communications device.

39. The mobile communications device according to claim 18, wherein the transmitting is further configured to transmit the system check message to the server upon expiration of the sleep mode based upon the initial registration.

40. The mobile communications device according to claim 19, wherein the means for transmitting is further configured to transmit the system check message to the server upon expiration of the sleep mode based upon the initial registration.

41. The method of claim 20, wherein transmitting the system check message to the server upon expiration of the sleep mode is based upon the initial registration.

42. A communications system, comprising:
means for storing data for the mobile communications device at a server while the mobile communications device is in a sleep mode;
means for receiving, via a first network using a first network technology, a system check message from a mobile communications device upon the mobile communications device changing from a sleep mode to an active mode, without intervening communication, the system check message indicating that the mobile communications device is in the active mode and requesting a response indicating whether an incoming call request for the mobile communications device has been received at the server;
means for determining whether the incoming call request has been received at the server for the mobile communications device, in response to receiving the system check message; and
means for transmitting the response indicating whether the incoming call request has been received for the mobile communications device,
wherein, if the server fails to provide the response, the mobile communications device is configured to establish a connection with a second network using a second network technology based at least in part upon an initial registration with the second network prior to entering the sleep mode, the second network technology being different from the first network technology.

43. The communications system according to claim 42, wherein the means for receiving is in response to an expiration of the sleep mode on the mobile communications device.

44. The mobile communications device of claim 1, wherein:
if the processor determines that the incoming call request has not been received at the server, the mobile communications device returns to the sleep mode for the predetermined time interval until sending a next system check message, and
if the processor determines that the incoming call request has been received at the server, the mobile communications device establishes a connection with the server to receive the incoming call.

45. The mobile communications device of claim 9, wherein:
if the processor determines that the incoming call request has not been received at the server, the mobile communications device returns to the sleep mode for the selectable sleep mode interval until sending a next system check message, and
if the processor determines that the incoming call request has been received at the server, the mobile communications device establishes a connection with the server to receive the incoming call.

46. The mobile communications device of claim 18, further comprising:

means for returning to the sleep mode for the predetermined time interval until sending a next system check message if it is determined that the incoming call request has not been received at the server; and means for establishing a connection with the server to receive the incoming call if it is determined that the incoming call request has been received at the server.

47. The mobile communications device of claim 19, further comprising:

means for returning to the sleep mode for the selectable sleep mode interval until sending a next system check message if it is determined that the incoming call request has not been received at the server; and means for establishing a connection with the server to receive the incoming call if it is determined that the incoming call request has been received at the server.

48. The method of claim 20, further comprising:

if it is determined that the incoming call request has not been received, returning the mobile communications device to the sleep mode for the selectable time interval until sending a next system check message; and if it is determined that the incoming call request has been received at the server, establishing a connection between the mobile communications device and the server to receive the incoming call.

49. The module of claim 25, further comprising:

information for returning the mobile communications device to the sleep mode for the predetermined time interval until sending a next system check message if it is determined that the incoming call request has not been received at the server; and information for establishing a connection with the server to receive the incoming call if it is determined that the incoming call request has been received at the server.

50. The module of claim 26, further comprising:

information for returning the mobile communications device to the sleep mode for the selectable sleep mode interval until sending a next system check message if it is determined that the incoming call request has not been received at the server; and information for establishing a connection with the server to receive the incoming call if it is determined that the incoming call request has been received at the server.

* * * * *